T. H. ETHERIDGE, Jr.
EVER LEVEL TABLE.
APPLICATION FILED SEPT. 24, 1910.
997,246.
Patented July 4, 1911.
2 SHEETS—SHEET 1.
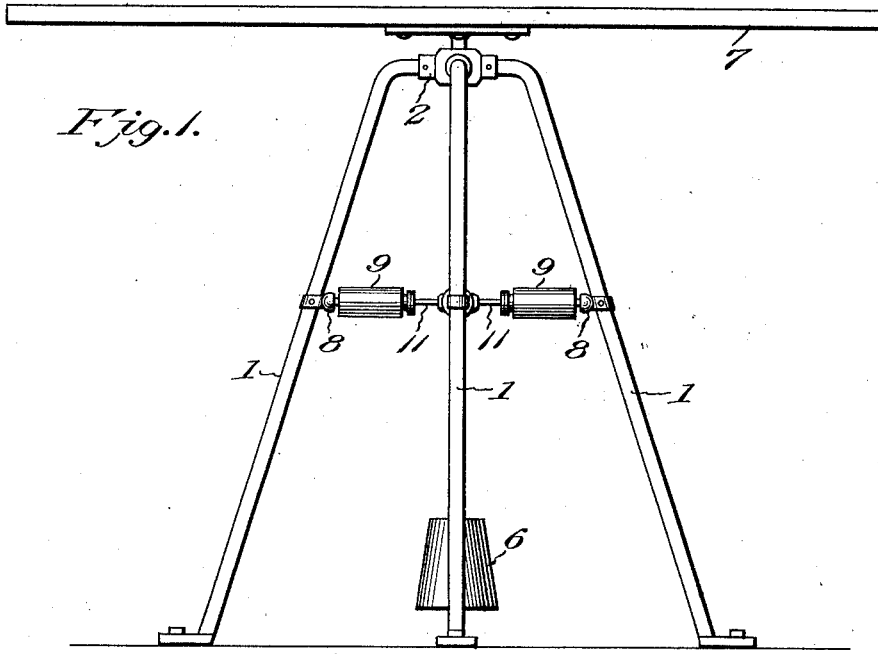
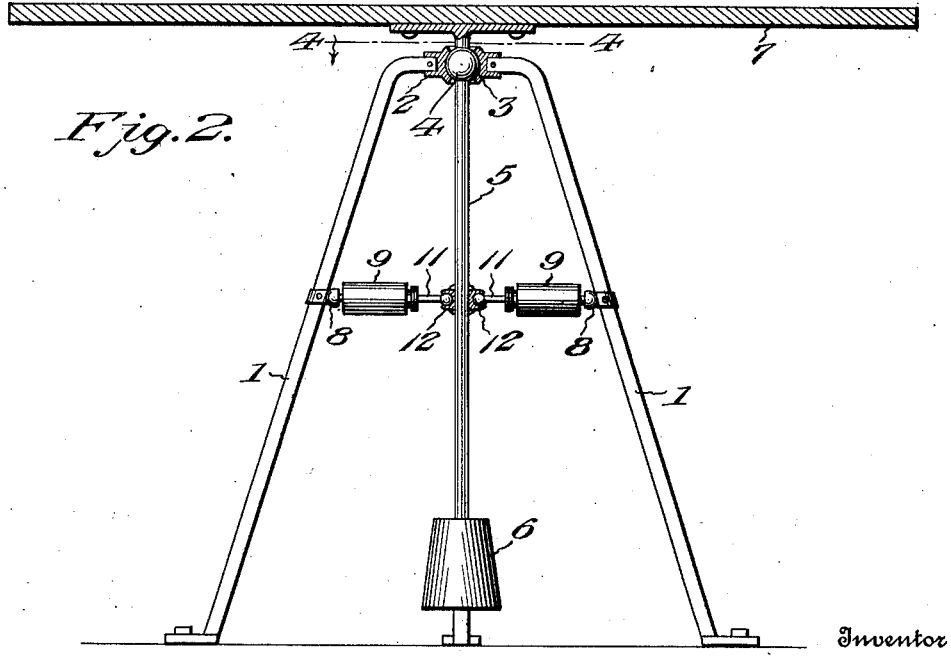
Witnesses
Edwin G. McKee
W. T. Bagger
Inventor
Thomas H. Etheridge, Jr.
By Victor J. Evans
Attorney T. H. ETHERIDGE, Jr.
EVER LEVEL TABLE.
APPLICATION FILED SEPT. 24, 1910.
997,246.
Patented July 4, 1911.
2 SHEETS—SHEET 2.
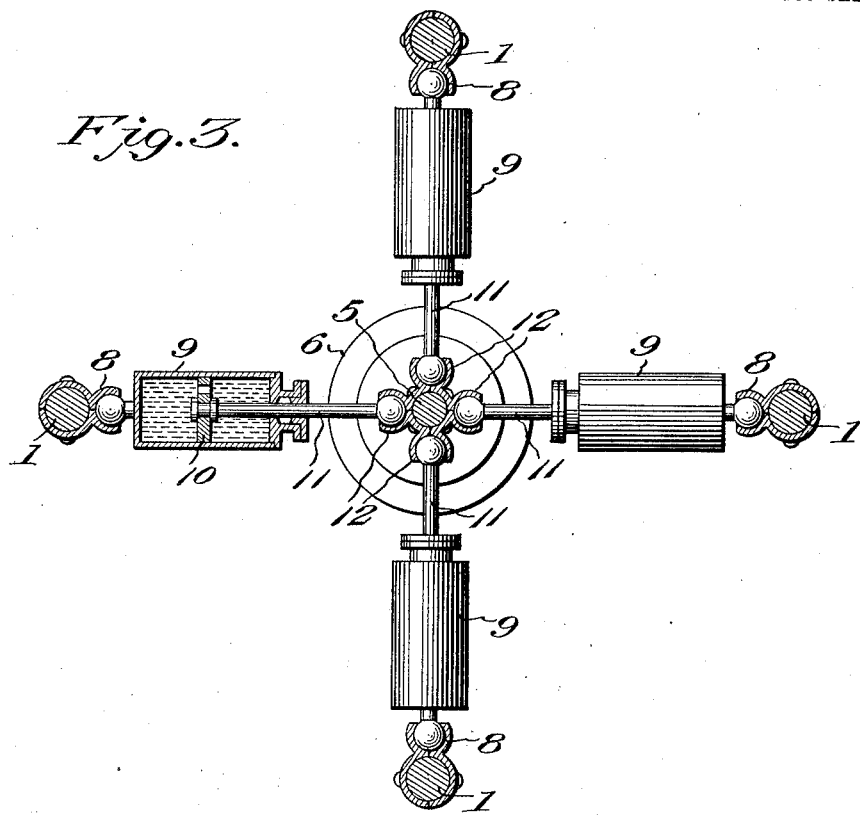
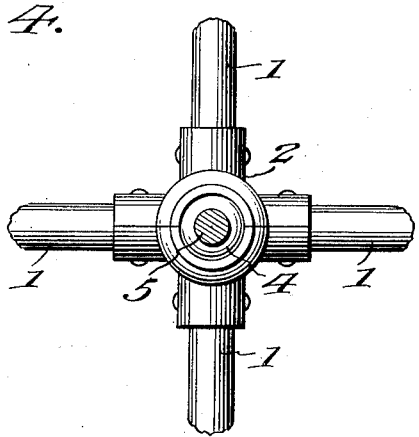
Witnesses
Edwin G. McKee
Wm. Bagger
Inventor
Thomas H. Etheridge, Jr.
By Victor J. Evans
Attorney

UNITED STATES PATENT OFFICE.

THOMAS H. ETHERIDGE, JR., OF HALLVILLE, TEXAS.

EVER-LEVEL TABLE.

997,246.  Specification of Letters Patent.  Patented July 4, 1911.

Application filed September 24, 1910. Serial No. 583,635.

*To all whom it may concern:*

Be it known that I, THOMAS H. ETHERIDGE, Jr., a citizen of the United States, residing at Hallville, in the county of Harrison and State of Texas, have invented new and useful Improvements in Ever-Level Tables, of which the following is a specification.

This invention relates to tables and more particularly to that type which are adapted to be used for train service on ship board or in similar places where it is necessary to provide means for maintaining the top constantly level.

The object of the invention is the provision of means for holding the top of the table constantly level and for maintaining such position without sudden movement or without causing overbalancing.

Further objects of the invention will appear as the following specific description is read in connection with the accompanying drawing which forms a part of this application, and in which:

Figure 1 is an elevation. Fig. 2 is a vertical section. Fig. 3 is a horizontal section. Fig. 4 is a detail top plan view with parts broken away.

Referring more particularly to the drawings 1 represents the supporting legs of which there may be any suitable number, all of which being connected at their upper ends by a casting 2 which is provided with a socket 3 adapted to receive a ball 4 carried upon the balance shaft 5. The lower end of the balance shaft is provided with a weight 6 which makes the balance shaft act as a pendulum and the upper end of the balance shaft above the ball has secured to it the table top 7.

Secured to each of the legs 1 immediately below the casting 2, by means of ball and socket joints 8 are closed cylinders 9 having the vented pistons 10 traveling therein and their piston rods 11 connected by means of a ball and socket joint 12 to the balance shaft 5. These cylinders are preferably filled with some non-freezing oil which passes through the vent as the piston is moved back and forth in the cylinder. If the balance rod moves directly toward one of the cylinders, the opposite cylinder will have a partial vacuum formed behind the piston while the cylinder toward which the shaft is traveling will expel the oil behind the piston through the vent and a partial vacuum will be formed in the fore part of the cylinder. The lateral cylinders will be turned upon their ball and socket connection with the casing and will also act in the manner of the cylinder opposite the one toward which the shaft is traveling.

Having thus described the invention, what is claimed is—

1. The combination with supporting legs of a universally mounted pendulum carried by said legs, a table top mounted on the pendulum rod above the legs, a plurality of double acting dash pots, and means for universally connecting the legs and the pendulum through the dash pots.

2. The combination with supporting legs connected together at their top and having a socket formed therein, of a table top, a pendulum rod secured to the table top, a ball on the pendulum rod to fit the socket in the supporting legs, a weight on the end of the pendulum rod, a plurality of cylinders, vented pistons operating therein and having piston rods projecting from the cylinders, universal joints connecting the piston rods with the pendulum rod, and universal joints for supporting the cylinders upon the supporting legs.

In testimony whereof I affix my signature in presence of two witnesses.

THOMAS H. ETHERIDGE, JR.

Witnesses:
  C. L. BROWN,
  C. H. HILL.

Copies of this patent may be obtained for five cents each, by addressing the " Commissioner of Patents, Washington, D. C."